(12) United States Patent
Moon et al.

(10) Patent No.: US 9,706,541 B2
(45) Date of Patent: *Jul. 11, 2017

(54) METHOD AND APPARATUS FOR RECEIVING A DOWNLINK SIGNAL IN A WIRELESS COMMUNICATION SYSTEM SUPPORTING CARRIER AGGREGATION

(71) Applicant: LG ELECTRONICS INC., Seoul (KR)

(72) Inventors: Sungho Moon, Anyang-si (KR); Seunghee Han, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,559

(22) Filed: Feb. 1, 2016

(65) Prior Publication Data
US 2016/0150511 A1    May 26, 2016

Related U.S. Application Data

(63) Continuation of application No. 14/445,256, filed on Jul. 29, 2014, now Pat. No. 9,295,049, which is a
(Continued)

(51) Int. Cl.
*H04W 4/00*        (2009.01)
*H04W 72/04*      (2009.01)
(Continued)

(52) U.S. Cl.
CPC ........... *H04W 72/042* (2013.01); *H04L 5/001* (2013.01); *H04L 5/0039* (2013.01);
(Continued)

(58) Field of Classification Search
None
See application file for complete search history.

(56) References Cited

U.S. PATENT DOCUMENTS

| | | |
|---|---|---|
| 8,364,196 B2 | 1/2013 | Marjelund et al. |
| 2010/0165847 A1 | 7/2010 | Kamuf et al. |

(Continued)

FOREIGN PATENT DOCUMENTS

| | | |
|---|---|---|
| CN | 102461301 | 5/2012 |
| CN | 102484552 | 5/2012 |

(Continued)

OTHER PUBLICATIONS

Qualcomm Europe, "PCFICH for Multicarrier Operation", R1-094204, 3GPP TSG RAN WG1 #58bis, Oct. 2009.
(Continued)

*Primary Examiner* — Charles C Jiang
*Assistant Examiner* — Rose Clark
(74) *Attorney, Agent, or Firm* — Lee Hong Degerman Kang & Waimey

(57) ABSTRACT

The present invention relates to a method for receiving a downlink signal at a terminal in a wireless communication system. In particular, the method comprises: receiving a control channel to be transmitted to a specific subframe via a first carrier; and decoding a data channel corresponding to the control channel to be transmitted to the specific subframe via a second carrier, using at least one parameter included in the control channel, wherein information on the orthogonal frequency division multiplexing (OFDM) start symbol of data channels that are transmitted via each of at least one carrier allocated to the terminal is signaled through an upper layer.

8 Claims, 15 Drawing Sheets

Related U.S. Application Data continuation of application No. 13/500,901, filed as application No. PCT/KR2011/000079 on Jan. 6, 2011, now Pat. No. 8,824,405.

(60) Provisional application No. 61/348,238, filed on May 25, 2010, provisional application No. 61/319,229, filed on Mar. 30, 2010, provisional application No. 61/296,838, filed on Jan. 20, 2010, provisional application No. 61/295,742, filed on Jan. 17, 2010, provisional application No. 61/293,212, filed on Jan. 8, 2010.

(51) Int. Cl.
*H04L 27/26* (2006.01)
*H04L 5/00* (2006.01)

(52) U.S. Cl.
CPC ........ *H04L 5/0094* (2013.01); *H04L 27/2601* (2013.01); *H04L 5/0007* (2013.01)

(56) References Cited

U.S. PATENT DOCUMENTS

| | | |
|---|---|---|
| 2010/0322158 A1 | 12/2010 | Lee et al. |
| 2011/0044239 A1 | 2/2011 | Cai et al. |
| 2011/0044259 A1 | 2/2011 | Nimbalker et al. |
| 2011/0044261 A1 | 2/2011 | Cai et al. |
| 2011/0064037 A1 | 3/2011 | Wei et al. |
| 2011/0070845 A1 | 3/2011 | Chen et al. |
| 2011/0103330 A1 | 5/2011 | Montojo et al. |
| 2011/0110316 A1 | 5/2011 | Chen et al. |
| 2011/0128922 A1 | 6/2011 | Chen et al. |
| 2011/0134774 A1 | 6/2011 | Pelletier et al. |
| 2011/0255486 A1 | 10/2011 | Luo et al. |
| 2012/0039180 A1 | 2/2012 | Kim et al. |
| 2012/0069795 A1 | 3/2012 | Chung et al. |
| 2013/0010709 A1 | 1/2013 | Earnshaw et al. |
| 2013/0016655 A1 | 1/2013 | Heo et al. |

FOREIGN PATENT DOCUMENTS

| | | |
|---|---|---|
| EP | 2453598 | 5/2012 |
| KR | 10-2008-0086317 | 9/2008 |
| KR | 10-2009-0099006 | 9/2009 |
| WO | 2011053974 | 5/2011 |

OTHER PUBLICATIONS

Fujitsu, "On solutions to PCFICH detection error in case of cross-carrier scheduling", R1-094248, 3GPP TSG-RAN1 #58bis, Oct. 2009.

Nokia et al., "Issues with Cross-Component Carrier Scheduling", R1-094645, 3GPP TSG RAN WG1 Meeting #59, Nov. 2009.

LG Electronics Inc., "PDSCH Starting Symbol Indication in Cross-Carrier Scheduling", R1-102364, TSG-RAN WG1 Meeting #60bis, Apr. 2010.

PCT International Application No. PCT/KR2011/000079, Written Opinion of the International Searching Authority dated Aug. 22, 2011, 12 pages.

State Intellectual Property Office of the People's Republic of China Application Serial No. 201180004503.0, Office Action dated Jul. 12, 2016, 10 pages.

Baker, "LTE-Advanced Physical Layer," 3GPP, REV-090003r1, IMT-Advanced Evaluation Workshop, Dec. 2009, 48 pages.

Qualcomm Europe, "Interpreting the Carrier Indicator Field," 3GPP TSG RAN WG1 #59, R1-095069, Nov. 2009, 4 pages.

European Patent Office Application Serial No. 11731921.0, Search Report dated Mar. 22, 2017, 10 pages.

NTT Docomo, "PCFICH for Cross-Carrier Assignmnet", R1-100492, 3GPP TSG RAN WG1 Meeting #59bis, Jan. 2010, 3 pages.

Texas Instruments, "PDCCH Carrier Indication Field for Cross-Carrier Scheduling", R1-094761, 3GPP TSG RAN WG1 Meeting #59, Nov. 2009, 4 pages.

Catt, "Impact of cross-carrier scheduling", R2-095480, 3GPP TSG RAN WG2 Meeting #67bis, Oct. 2009, 6 pages.

(a) Control-plane protocol stack (b) User-plane protocol stack

METHOD AND APPARATUS FOR RECEIVING A DOWNLINK SIGNAL IN A WIRELESS COMMUNICATION SYSTEM SUPPORTING CARRIER AGGREGATION

CROSS-REFERENCE TO RELATED APPLICATIONS

This application is a continuation of U.S. patent application Ser. No. 14/445,256, filed on Jul. 29, 2014, now U.S. Pat. No. 9,295,049, which is a continuation of U.S. patent application Ser. No. 13/500,901, filed on Apr. 6, 2012, now U.S. Pat. No. 8,824,405, which is the National Stage filing under 35 U.S.C. 371 of International Application No. PCT/KR2011/000079, filed on Jan. 6, 2011, which claims the benefit of U.S. Provisional Application Nos. 61/348,238, filed on May 25, 2010, 61/319,229, filed on Mar. 30, 2010, 61/296,838, filed on Jan. 20, 2010, 61/295,742, filed on Jan. 17, 2010, and 61/293,212, filed on Jan. 8, 2010, the contents of which are all hereby incorporated by reference herein in their entirety.

TECHNICAL FIELD

The present invention relates to a wireless communication system, and more particularly, to a method and apparatus for receiving a downlink signal in a wireless communication system supporting multiple carriers.

BACKGROUND ART

As an example of a mobile communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE) 120, base stations (or eNBs or eNode Bs) 110a and 110b, and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

Recently, the standardization of the subsequent technology of the LTE is ongoing in the 3GPP. In the present specification, the above-described technology is called "LTE-Advanced" or "LTE-A". The LTE system and the LTE-A system are different from each other in terms of system bandwidth. The LTE-A system aims to support a wide bandwidth of a maximum of 100 MHz. The LTE-A system uses carrier aggregation or bandwidth aggregation technology which achieves the wide bandwidth using a plurality of frequency blocks. Carrier aggregation enables the plurality of frequency blocks to be used as one large logical frequency bandwidth in order to use a wider frequency bandwidth. The bandwidth of each of the frequency blocks may be defined based on the bandwidth of a system block used in the LTE system. Each frequency block is transmitted using a component carrier.

DISCLOSURE

Technical Problem

An object of the present invention is to provide a method and apparatus for receiving a downlink signal in a wireless communication system supporting multiple carriers.

The technical problems solved by the present invention are not limited to the above technical problems and those skilled in the art may understand other technical problems from the following description.

Technical Solution

The object of the present invention can be achieved by providing a method for receiving a downlink signal at a user equipment (UE) in a wireless communication system supporting carrier aggregation, the method including receiving a control channel transmitted in a specific subframe via a first carrier, and decoding a data channel corresponding to the control channel transmitted in the specific subframe via a second carrier using one or more parameters included in the control channel, wherein information about a start orthogonal frequency division multiplexing (OFDM) symbol of data channels transmitted via one or more carriers allocated to the UE is signaled via a higher layer.

In another aspect of the present invention, there is provided a user equipment in a user equipment (UE) in a wireless communication system supporting carrier aggregation, including a reception module configured to receive a signal transmitted via one or more carriers allocated to the UE; and a processor configured to process the signal, wherein the processor decodes a data channel corresponding to a control channel transmitted in a specific subframe via a second carrier using one or more parameters included in the control channel transmitted in the specific subframe via a first carrier, and wherein information about a start orthogonal frequency division multiplexing (OFDM) symbol of data channels transmitted via one or more carriers allocated to the UE is signaled via a higher layer.

The second carrier may be defined by a carrier indicator field (CIF) included in the control channel transmitted via the first carrier.

The information about the start OFDM symbol of the data channel may include indexes of the carriers allocated to the UE and an index of a start OFDM symbol position.

If the first carrier and the second carrier are the same, the information about the start OFDM symbol of the data channels may be defined based on a control format indicator (CFI) transmitted via the first carrier.

A radio resource control (RRC) message and RRC grant for signaling the start OFDM symbol may be transmitted via the same carrier.

Advantageous Effects

According to the embodiments of the present invention, it is possible to efficiently receive a downlink signal at a user equipment (UE) in a wireless communication system supporting multiple carriers.

The effects of the present invention are not limited to the above-described effects and other effects which are not described herein will become apparent to those skilled in the art from the following description.

BEST MODE

The configuration, operation and other features of the present invention will be understood by the embodiments of the present invention described with reference to the accompanying drawings. The following embodiments are examples of applying the technical features of the present invention to a 3$^{rd}$ Generation Partnership Project (3GPP) system.

In the present specification, a 3GPP LTE system is called an LTE system or a legacy system. A user equipment (UE) which supports an LTE system is called an LTE UE or a legacy UE. A 3GPP LTE-A (Release-9) system is called an LTE-A system or an evolved system. A UE which supports an LTE-A system is called an LTE-A UE or an evolved UE.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
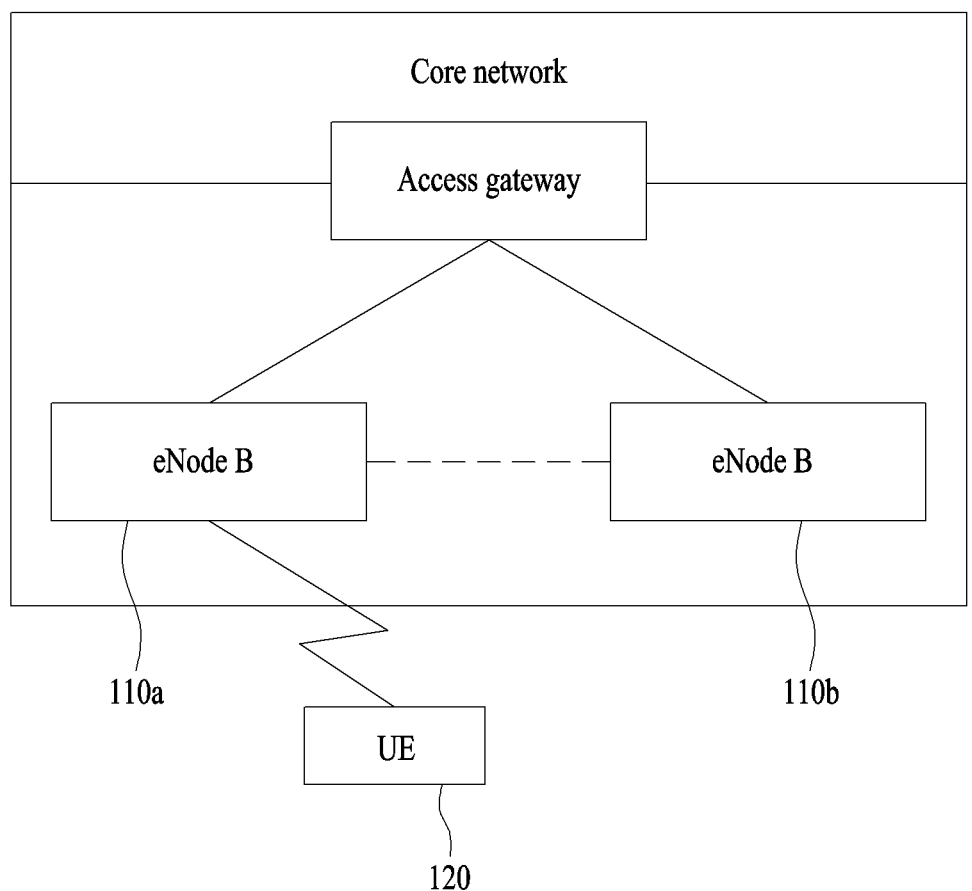
FIG. 1 is a diagram showing a network structure of an Evolved Universal Mobile Telecommunications System (E-UMTS) as an example of a mobile communication system.
Figure 2:
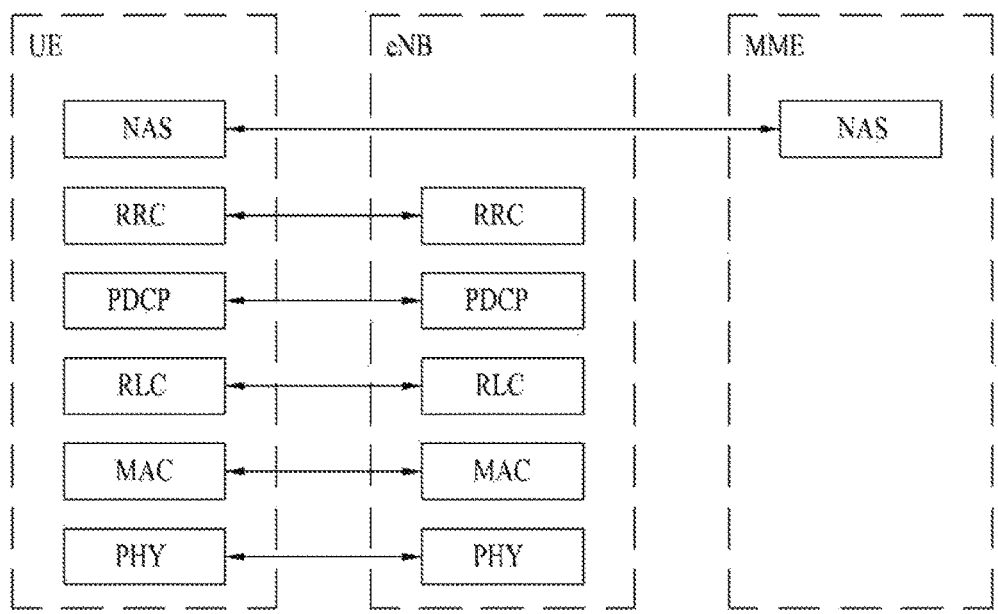
FIG. 2 is a diagram showing a control plane and a user plane of a radio interface protocol architecture between a User Equipment (UE) and an Evolved Universal Terrestrial Radio Access Network (E-UTRAN) based on a 3$^{rd}$ Generation Partnership Project (3GPP) radio access network standard.
Figure 2:
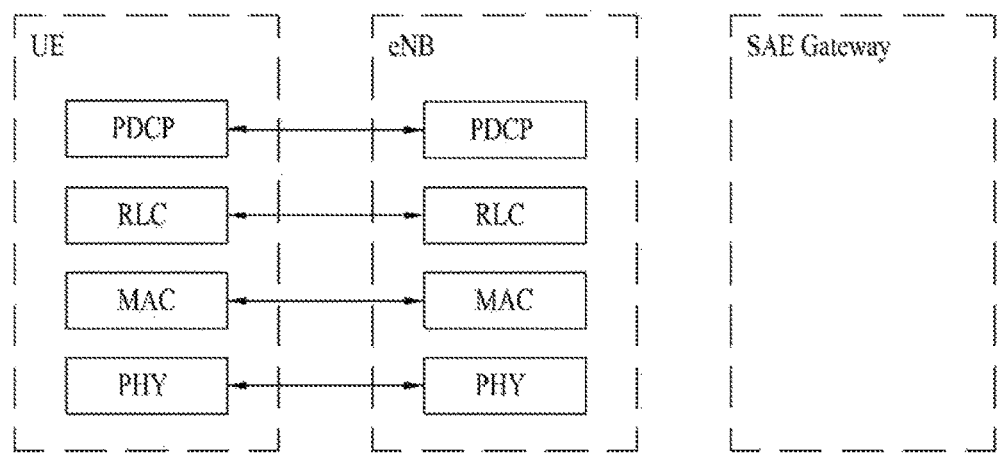

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
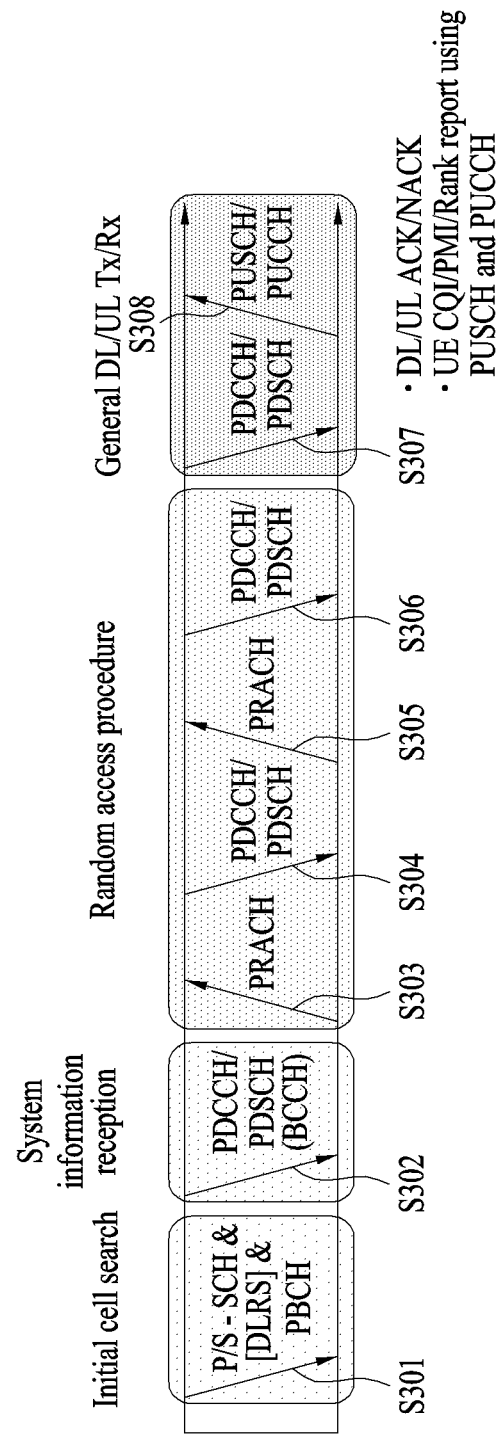
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
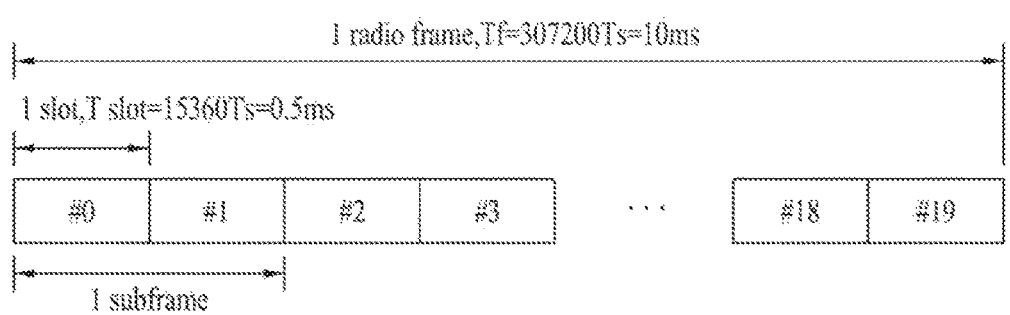
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM or SC-FDMA symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
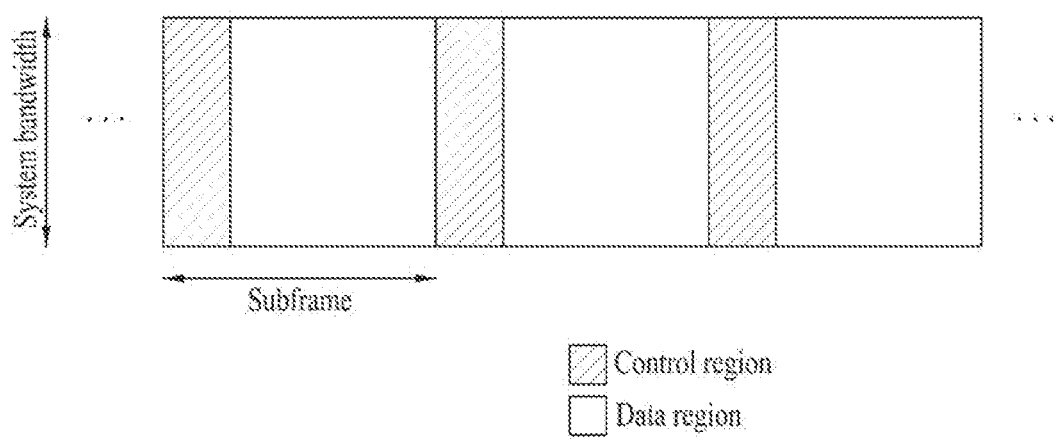
FIG. 5 is a diagram showing the functional structure of a downlink radio frame in an LTE system.

FIG. 5 is a diagram showing the functional structure of a downlink radio frame.

Referring to FIG. 5, a downlink radio frame includes 10 subframes having the same length. In the 3GPP LTE system, the subframe is defined as a basic time unit of packet scheduling for the entire downlink frequency. Each subframe is divided into a control region for transmission of scheduling information and other control channels and a data region for transmission of downlink data. The control region starts from a first OFDM symbol of the subframe and includes one or more OFDM symbols. The size of the control region may be independently set for each subframe. The control region is used to transmit an L1/L2 (layer 1/layer 2) control signal. The data region is used to transmit downlink traffic.

Figure 6:
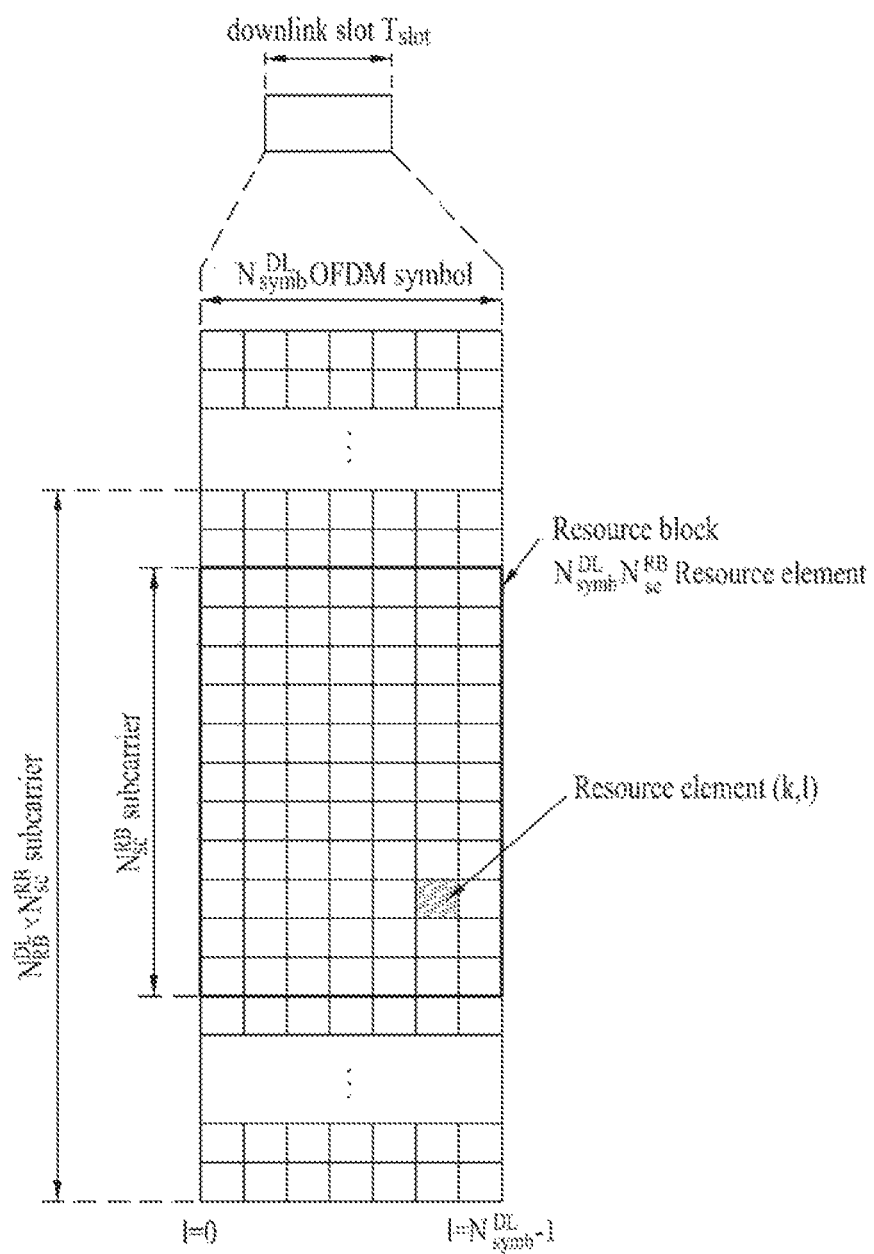
FIG. 6 is a diagram showing a resource grid of a downlink slot in an LTE system.

FIG. 6 is a diagram showing a resource grid of a downlink slot in an LTE system.

Referring to FIG. 6, a downlink slot includes $N^{DL}_{symb}$ OFDM symbols in a time domain and $N^{DL}_{RB}$ RBs in a frequency domain. Since each RB includes $N^{RB}_{SC}$ subcarriers, the downlink slot includes $N^{DL}_{RB} \times N^{RB}_{sc}$ subcarriers in the frequency domain. Although FIG. 6 shows the case in which the downlink slot includes seven OFDM symbols and the RB includes 12 subcarriers, the present invention is not limited thereto. For example, the number of OFDM symbols included in the downlink slot may be changed according to the length of a cyclic prefix (CP).

Each element of the resource grid is referred to as a resource element (RE) and one RE is indicated by one OFDM symbol index and one subcarrier index. One RB includes $N^{DL}_{symb} \times N^{RB}_{SC}$ REs. The number ( ) of RBs included in the downlink slot depends on a downlink transmission bandwidth set in a cell.

Figure 7:
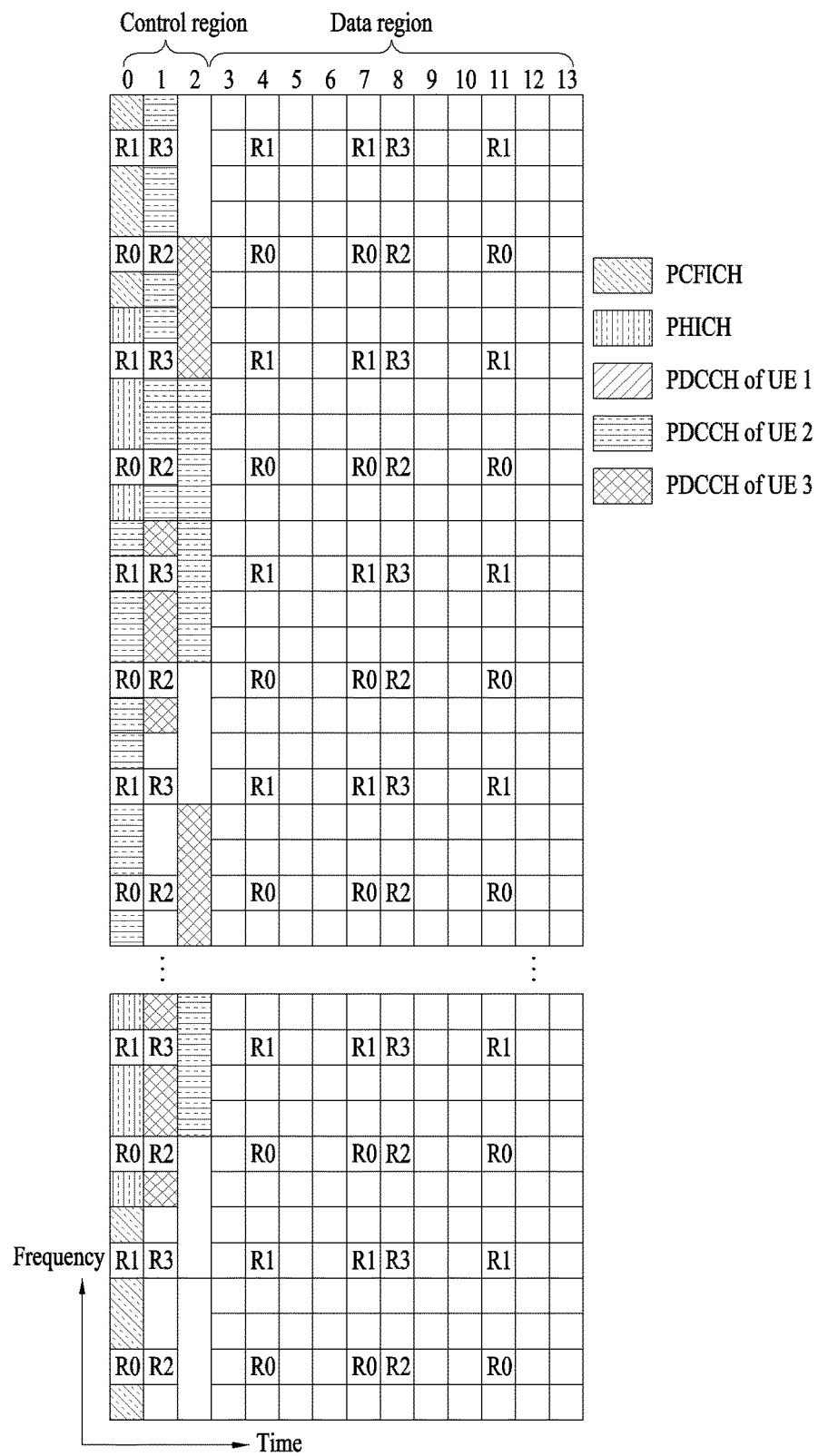
FIG. 7 is a diagram showing a control channel included in a control region of a subframe in an LTE system.

FIG. 7 is a diagram showing a control channel included in a control region of a subframe in an LTE system.

Referring to FIG. 7, a subframe includes 14 OFDM symbols. The first to third OFDM symbols are used as a control region and the remaining 13 to 11 OFDM symbols are used as a data region, according to subframe settings.

In FIG. 7, R0 to R3 denote reference signals (RS) for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is set prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 and is modulated using a Quadrature Phase Shift Keying (QPSK) scheme.

The Physical Hybrid-ARQ Indicator Channel (PHICH) is used to transmit HARQ ACK/NACK for uplink transmission. The PHICH includes three REGs and is scrambled on a cell-specific basis. ACK/NACK is indicated by one bit and is repeatedly spread three times with a spreading factor (SF) of 2 or 4. A plurality of PHICHs may be mapped to the same resources. The PHICH is modulated using binary phase shift keying (PBSK) scheme.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs), which will be described in greater detail below. The PDCCH informs each UE or a UE group of information associated with resource allocation of a Paging Channel (PCH) and a Downlink-Shared Channel (DL-SCH), both of which are transport channels, uplink scheduling grant, HARQ information, etc.

The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 8:
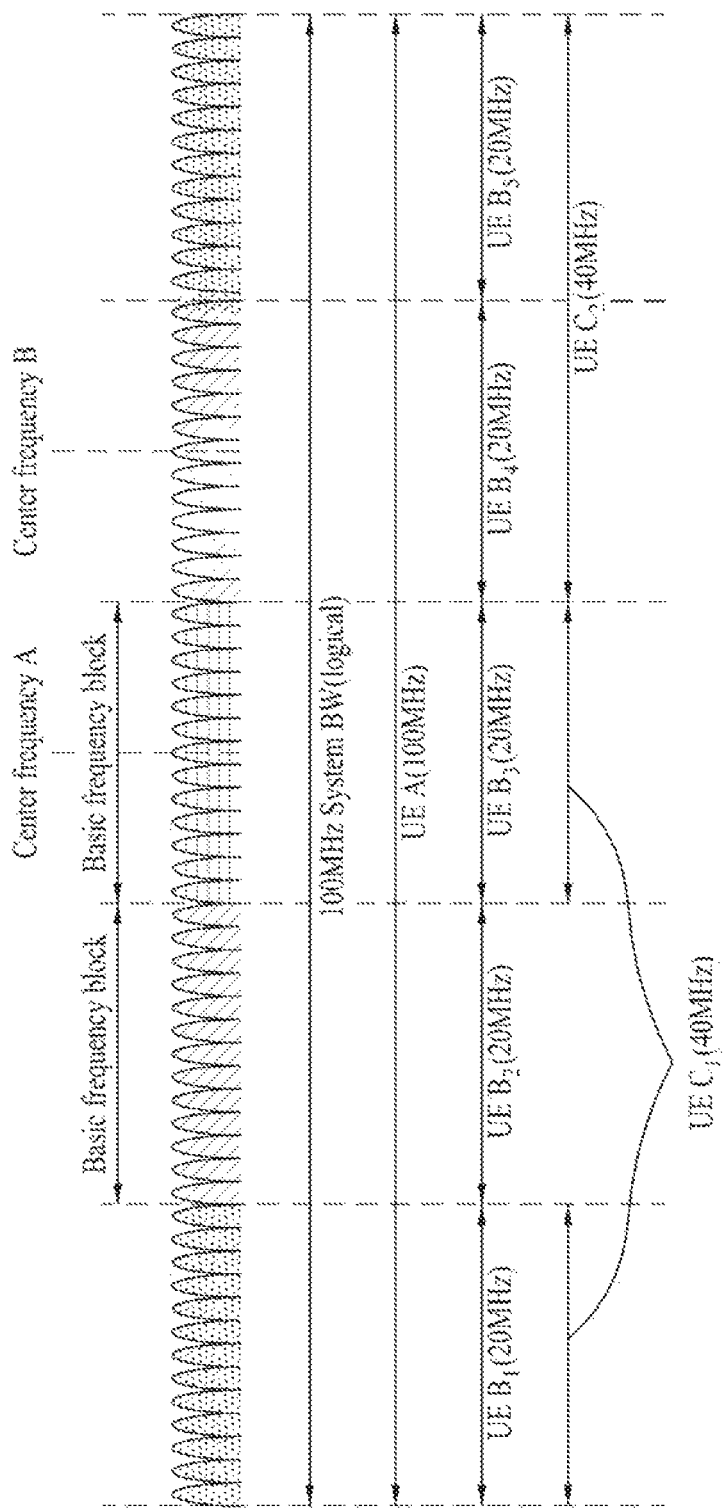
FIG. 8 is a conceptual diagram illustrating carrier aggregation.

FIG. 8 is a conceptual diagram illustrating carrier aggregation. Carrier aggregation refers to a method of using a plurality of component carriers as a large logical frequency bandwidth in order to use a wider frequency bandwidth in a radio communication system.

Referring to FIG. 8, an entire system bandwidth (BW) is a logical bandwidth having a maximum bandwidth of 100 MHz. The entire system bandwidth includes five component carriers (CCs) and each CC has a maximum bandwidth of 20 MHz. The CC includes one or more physically contiguous subcarriers.

A method of utilizing one or more CCs in carrier aggregation includes two methods including a cell-specific method and a UE-specific method. The term "cell-specific" generally refers to spatial meaning and means that a carrier configuration managed by an arbitrary cell or eNB is used.

In addition, the term CC may be replaced with the term "cell". More specifically, the cell means frequency resources including a combination of downlink CCs and uplink CCs paired thereto or frequency resources including downlink CCs. That is, the cell used herein means a frequency resource division unit and is different from a cell of spatial meaning. Accordingly, the downlink CC and the uplink CC may be referred to as a downlink cell and an uplink cell, respectively. In this case, the term "cell-specific" means that one or more CCs managed by an arbitrary eNB are used.

Although all CCs have the same bandwidth in FIG. 8, this is only exemplary and the CCs may have different bandwidths. Although the CCs are shown as being contiguous in the frequency domain in FIG. 8, FIG. 8 merely shows the logical concept and thus the CCs may be physically contiguous or separated.

Different center frequencies may be used for the CCs or one common center frequency may be used for physically contiguous CCs. For example, in FIG. 9, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system bandwidth of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system bandwidth of the LTE system. In this case, the CC may have any one bandwidth such as 1.25, 2.5, 5, 10 or 20 MHz.

In the case in which the entire system bandwidth is extended by carrier aggregation, a frequency bandwidth used for communication with each UE is defined in CC units. A UE A may use 100 MHz which is the entire system bandwidth and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may be contiguous or discontiguous. The UE $C_1$ uses two discontiguous CCs and the UE $C_2$ uses two contiguous CCs.

While one downlink CC and one uplink component are used in the LTE system, several component carriers may be used in the LTE-A system as shown in FIG. 8. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator (CI) schedules a data channel transmitted via the primary CC or another CC. The cross carrier scheduling method causes serious errors as compared to the linked carrier scheduling method when errors occur in the control format indicator (CFI). Meanwhile, the presence of the CI (or CI field (CIF)) or not may be semi-statically enabled.

That is, configuration information whether or not the CI is included in the PDCCH may be signaled via higher layer signal. If the CI is included in the PDCCH (that is, if the CI is configured), the CI may have 3-bit length. If the CI is included in the PDCCH (that is, if the CI is configured), location of the CI in the PDCCH is fixed irrespective of DCI format size.

As described above, in the case of cross carrier scheduling, a carrier used to transmit a PDCCH and a carrier used to transmit a PDSCH are different. Thus, if a UE does not successfully receive a CFI value through a PCFICH in the carrier used to transmit the PDSCH, a HARQ buffer corruption problem may occur. In order to solve this problem, a CFI value of a CC in which the cross-carrier scheduled PDSCH is transmitted or information corresponding to the CFI value may be sent via an arbitrary channel or a PDCCH for downlink grant only upon cross carrier scheduling.

More specifically, currently, in the LTE system, up to a total of four OFDM symbols may be used as a common control region if a bandwidth is equal to or less than 6 RBs and up to a total of three OFDM symbols may be used as a common control region if a bandwidth is greater than 6 RBs. Accordingly, 2 bits may be added to information transmitted via the PDCCH for downlink grant (or an arbitrary channel) so as to indicate the CFI value of the carrier in which the cross-carrier scheduled PDSCH is transmitted.

As another method, in order to signal a start OFDM symbol in which a cross-carrier scheduled PDSCH is transmitted, a data start indicator (DSI) may be added to information transmitted via a PDCCH for downlink grant (or an arbitrary channel).

More specifically, non-cross-carrier scheduled PDSCHs may be transmitted such that a start OFDM symbol of a PDSCH is determined according to a CFI value received via a PCFICH as in the legacy LTE system, but a non-cross-carrier scheduled PDSCH may be transmitted from a (maximum CFI–DSI+1)-th OFDM symbol, which will be described in greater detail with reference to the drawings.

Figure 9:
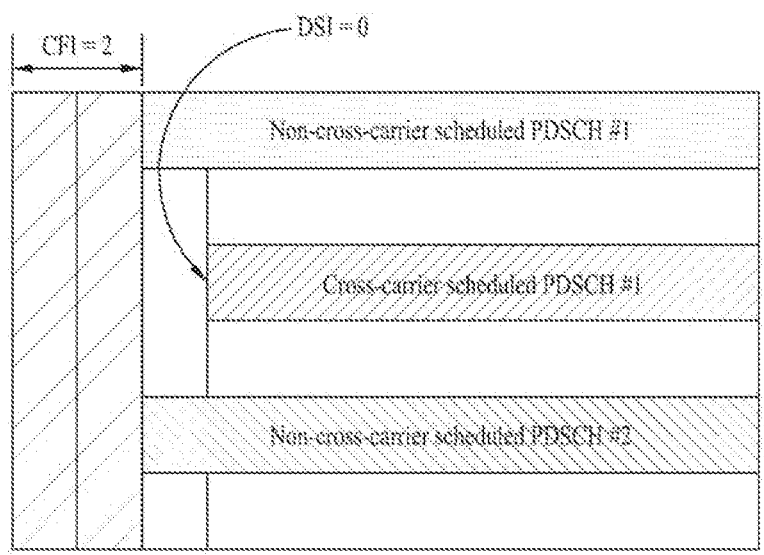
FIGS. 9 to 12 are diagrams illustrating a method of indicating a start OFDM symbol in which a PDSCH is transmitted using a DSI according to an embodiment of the present invention.
Figure 10:
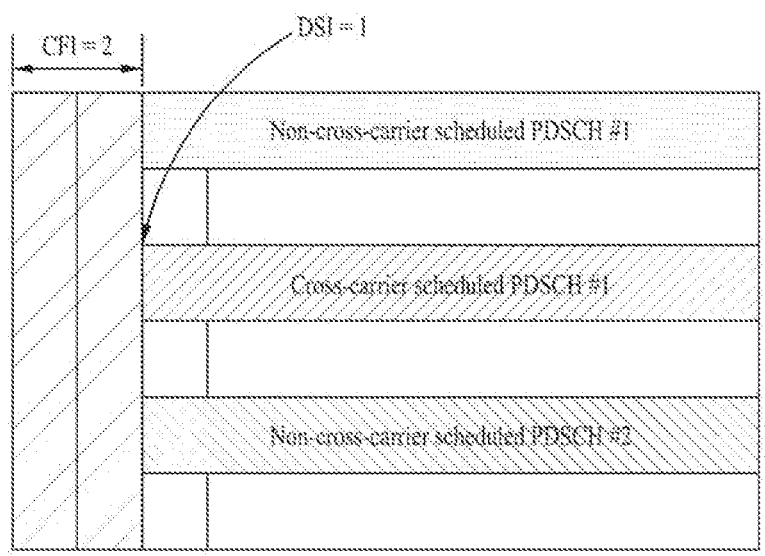
Figure 11:
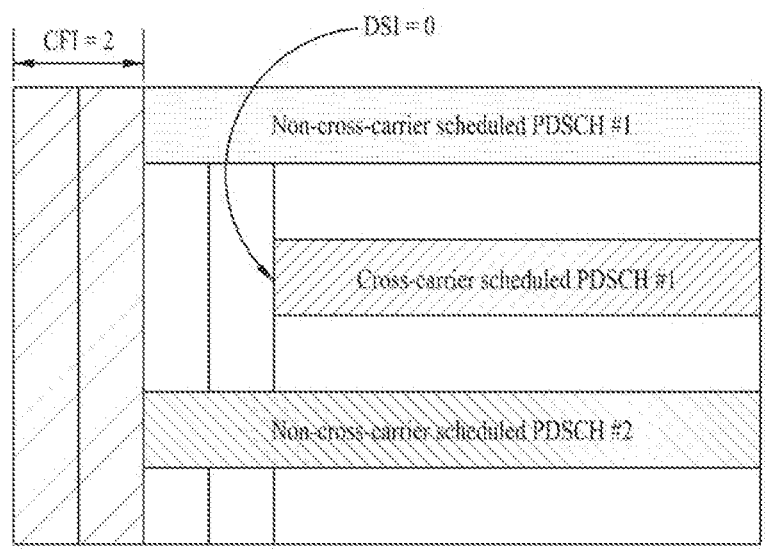
Figure 12:
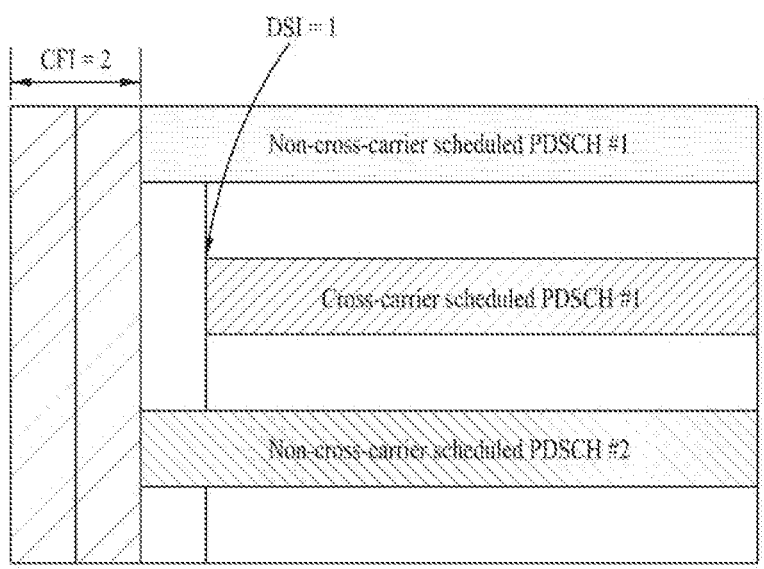

FIGS. 9 to 12 are diagrams illustrating a method of indicating a start OFDM symbol in which a PDSCH is transmitted using a DSI according to an embodiment of the present invention. In particular, FIGS. 9 and 10 show the cases in which a DSI value is 0 and 1 if a system bandwidth is greater than 6 RBs. FIGS. 11 and 12 show the cases in which a DSI value is 0 and 1 if a system bandwidth is equal to or less than 6 RBs.

In FIGS. 9 and 10, since a maximum CFI value is 3, transmission of the cross-carrier scheduled PDSCH starts from a fourth OFDM symbol if the DSI is 0 and transmission of a cross-carrier scheduled PDSCH starts from a third OFDM symbol if the DSI is 1.

In addition, FIGS. 11 and 12 show the case in which a maximum CFI value is 4 and are interpreted similarly to FIGS. 9 and 10. That is, transmission of the cross-carrier scheduled PDSCH starts from a fifth OFDM symbol if the DSI is 0 and transmission of a cross-carrier scheduled PDSCH starts from a fourth OFDM symbol if the DSI is 1. In the above-described example, interpretation of DSI=0 and DSI=1 may be reversed. In addition, in a method of indicating OFDM symbols using the DSI, non-available REs may be generated if the DSI does not cover a region indicated by a maximum CFI, but wasted resources may be reduced as compared to a method of always transmitting a PDSCH starting from a symbol next to a maximum control region without transmitting a DSI.

As another method, if mapping of REs for cross-carrier scheduled PDSCHs is performed in inverse order starting from a last symbol of one subframe, in order to signal a last symbol in which RE mapping is finished, a data ending indicator (DEI) may be added to a PDCCH for downlink grant (or an arbitrary channel).

If it is assumed that mapping of REs for a cross-carrier scheduled PDSCH is performed using a wrap-around method, a data addition indicator (DAdI) indicating the number of additionally mapped OFDM symbols may be added to information transmitted via a PDCCH for downlink grant (or an arbitrary channel) after mapping of REs for a PDSCH is performed from a predetermined OFDM symbol to a last symbol of one subframe, which will be described in greater detail with reference to the drawings.

Figure 13:
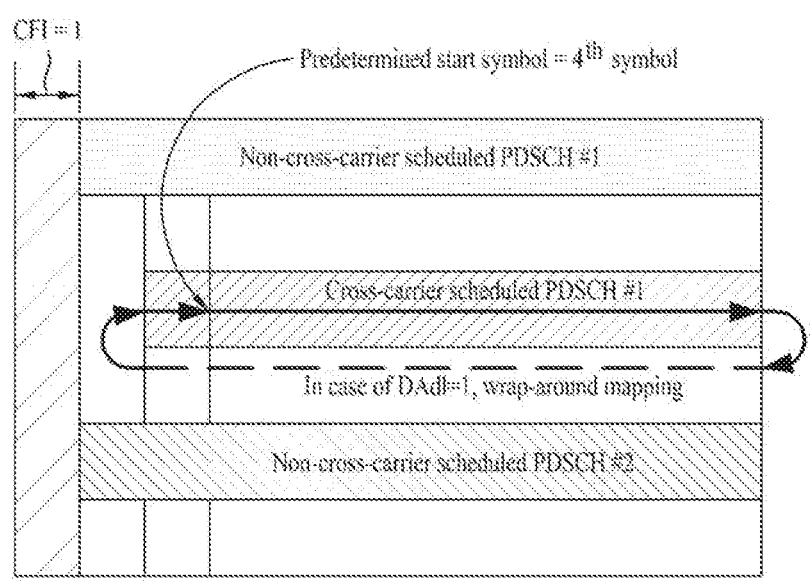
FIGS. 13 and 14 are diagrams illustrating a method of indicating the number of additionally mapped OFDM symbols in order to transmit a PDSCH using a DAdI according to an embodiment of the present invention.
Figure 14:
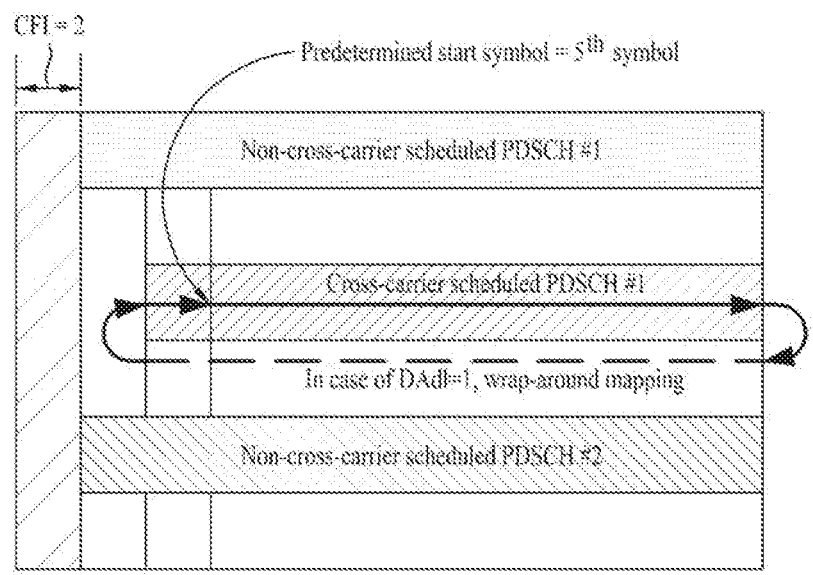

FIGS. 13 and 14 are diagrams illustrating a method of indicating the number of additionally mapped OFDM symbols in order to transmit a PDSCH using a DAdI according to an embodiment of the present invention. FIGS. 13 and 14 show the case in which the DAdI is 1.

Referring to FIG. 13, if a maximum CFI value is 3 and a predetermined OFDM symbol is a fourth symbol, mapping of REs for a PDSCH is performed from a fourth symbol to a last symbol of one subframe. Since the DAdI is 1, an RE for a PDSCH is mapped to one OFDM symbol, that is, a third symbol. In FIG. 14, if a maximum CFI value is 4 and a predetermined OFDM symbols is a fifth symbol, mapping of REs for a PDSCH is performed from a fifth symbol to a last symbol of one subframe. Since the DAdI is 1, an RE for a PDSCH is mapped to one OFDM symbol, that is, a fourth symbol. If the DAdI is 0, RE mapping shown in FIGS. 9 and 10 may be performed.

As another method, an identical CFI flag (ICF) indicating whether a CC in which a PDCCH is transmitted and a CC in which a PDSCH is transmitted have the same CFI value may be added to information transmitted via a PDCCH for downlink grant (or an arbitrary channel).

If a CC in which a PDCCH is transmitted and a CC in which a PDSCH is transmitted have the same CFI value, that is, if the ICF is 0, a UE can identify the position of the start OFDM symbol of the PDSCH in the CC in which the PDSCH is transmitted using the configuration of the CC in which the PDCCH is transmitted. However, if a CC in which a PDCCH is transmitted and a CC in which a PDSCH is transmitted have different CFI values, that is, if the ICF is 1, a UE performs HARQ buffering based on a maximum CFI of a CC in which a PDSCH is transmitted. Accordingly, in order to prevent loss of systematic bits of the PDSCH, transmission of a cross-carrier scheduled PDSCH may always start from an OFDM symbol next to the maximum CFI.

In addition, if the CFI of the CC in which the PDSCH is transmitted is less than the CFI of the CC in which the PDCCH is transmitted, the ICF is set to 0 and PDSCH transmission starts from the same CFI as the CC in which the PDCCH is transmitted. In contrast, if the CFI of the CC in which the PDSCH is transmitted is greater than the CFI of the CC in which the PDCCH is transmitted, the ICF is set to 1 and PDSCH transmission starts from an OFDM symbol next to a maximum CFI of the CC in which the PDSCH is transmitted.

An offset value to be added to a CFI value of a CC in which a PDCCH is transmitted may be further included in information transmitted via a PDCCH for downlink grant (or an arbitrary channel). The offset value may have an arbitrary value (a positive integer or a negative integer). For example, if it is assumed that a CFI value of a CC in which a PDCCH is transmitted is A and the position of a start OFDM symbol of the PDSCH in the CC in which the PDSCH is transmitted is B, the value of B may be obtained by adding or subtracting the offset value to or from A.

In addition, if A is not a CFI of a CC in which a PDCCH is transmitted but is a CFI of a cross-carrier scheduled CC, a UE may falsely detect the value of A due to PCFICH errors of the cross-carrier scheduled CC. In this case, mapping of REs for PDSCH always starts from a predetermined OFDM symbol and the remaining symbols mapped using the wraparound method may be set based on offset information.

As a method of adding the above-described DSI, DEI, DAdI or offset value (hereinafter referred to as information about a start OFDM symbol) to information transmitted via a PDCCH for downlink grant (or an arbitrary channel) signaled to a UE, a method of adding a field to a DCI format configured for cross-carrier scheduling in an LTE-A system may be considered. The added field preferably has a constant size at a fixed position.

In addition, information about the start OFDM symbol may be configured using some bits or some states of a CIF (Carrier Indication Field) having a size of 3 bits. If the number of CCs subjected to carrier aggregation is small, all possible start OFDM symbols to which a PDSCH may be mapped may be signaled. However, if the number of CCs is increased, the start OFDM symbol may be signaled using information about the start OFDM symbol of 1 bit according to the present invention.

Table 1 shows an example of indicating a start OFDM symbol position using CIF (Carrier Indication Field) information. It is assumed that a CC indicates a component carrier, B indicates a start OFDM symbol position of a cross-carrier scheduled PDSCH, and system bandwidth is greater than 6 RBs.

TABLE 1

| CIF | Number of Available CCs | | | |
|---|---|---|---|---|
| | 2 | 3 | 4 | 5 |
| 000 | CC0 | CC0 | CC0 | CC0 |
| 001 | CC1, B = 1 | CC1, B = 1 | CC1, B = 2 | CC1, B = 3 |
| 010 | CC1, B = 2 | CC1, B = 2 | CC1, B = 3 | CC2, B = 3 |
| 011 | CC1, B = 3 | CC1, B = 3 | CC2, B = 2 | CC3, B = 3 |
| 100 | N/A | CC2, B = 1 | CC2, B = 3 | CC4, B = 3 |
| 101 | N/A | CC2, B = 2 | CC3, B = 2 | N/A or (CCx, B = x) |
| 110 | N/A | CC2, B = 3 | CC3, B = 3 | N/A or (CCx, B = x) |
| 111 | N/A | N/A | N/A or (CCx, B = x) | N/A or (CCx, B = x) |

In Table 1, all start OFDM symbol positions B having values of 1, 2 and 3 are represented by up to three CCs. However, only the start OFDM symbol positions B having values of 2 and 3 may be represented if the number of CCs is 4 and only the start OFDM symbol position B having a value of 3 may be represented if the number of CCs is 5. If the number of CCs is 4 or 5, the remaining states may go unused or may be used to represent a start OFDM symbol position which is not used to represent an arbitrary CC. At this time, information indicating for which CC the remaining state is used may be indicated through higher layer signaling.

For example, if the number of CCs is 5, only B having a value of 3 is indicated and thus three states are left. Thus, the remaining three states may indicate information shown in Tables 2 to 4 through higher layer signaling. Tables 2 to 4 show examples of signaling the remaining states 101, 110 and 111 if the number of CCs is 5.

Table 2 shows an additional indication which is set with respect to each CC through higher layer signaling when B is 2 and Table 3 shows an additional indication which is set through higher layer signaling when B is 1.

TABLE 2

| RRC signaling | Remaining States | | |
|---|---|---|---|
| | 101 | 110 | 111 |
| 0 | CC1, B = 2 | CC2, B = 2 | CC3, B = 2 |
| 1 | CC1, B = 2 | CC2, B = 2 | CC4, B = 2 |
| 2 | CC1, B = 2 | CC3, B = 2 | CC4, B = 2 |
| 3 | CC2, B = 2 | CC3, B = 2 | CC4, B = 2 |

TABLE 3

| RRC signaling | Remaining States | | |
|---|---|---|---|
| | 101 | 110 | 111 |
| 0 | CC1, B = 1 | CC2, B = 1 | CC3, B = 1 |
| 1 | CC1, B = 1 | CC2, B = 1 | CC4, B = 1 |
| 2 | CC1, B = 1 | CC3, B = 1 | CC4, B = 1 |
| 3 | CC2, B = 1 | CC3, B = 1 | CC4, B = 1 |

Table 4 shows an additional indication which is set with respect to a specific CC through higher layer signaling when B is 1 or 2. According to Table 4, even when CC2, CC3 and CC4 require B having values of 1 and 2, six higher layer signaling values may be added.

TABLE 4

| RRC signaling | Remaining States | | |
|---|---|---|---|
| | 101 | 110 | 111 |
| 0 | CC1, B = 1 | CC1, B = 2 | CC2, B = 2 |
| 1 | CC1, B = 1 | CC1, B = 2 | CC3, B = 2 |
| 2 | CC1, B = 1 | CC1, B = 2 | CC4, B = 2 |
| 3 | CC1, B = 1 | CC1, B = 2 | CC2, B = 1 |
| 4 | CC1, B = 1 | CC1, B = 2 | CC3, B = 1 |
| 5 | CC1, B = 1 | CC1, B = 2 | CC4, B = 1 |

If it is assumed that a CC in which a PDCCH is transmitted is not used, as shown in Table 5, up to B having a value of 2 may be presented by the CIF if the number of CCs is 5.

TABLE 5

| CIF | Number of Available CCs | | | |
|---|---|---|---|---|
| | 2 | 3 | 4 | 5 |
| 000 | CC1, B = 1 | CC1, B = 1 | CC1, B = 2 | CC1, B = 2 |
| 001 | CC1, B = 2 | CC1, B = 2 | CC1, B = 3 | CC1, B = 3 |
| 010 | CC1, B = 3 | CC1, B = 3 | CC2, B = 2 | CC2, B = 2 |
| 011 | N/A | CC2, B = 1 | CC2, B = 3 | CC2, B = 3 |
| 100 | N/A | CC2, B = 2 | CC3, B = 2 | CC3, B = 2 |
| 101 | N/A | CC2, B = 3 | CC3, B = 3 | CC3, B = 3 |
| 110 | N/A | N/A | N/A or (CCx, B = x) | CC4, B = 2 |
| 111 | N/A | N/A | N/A or (CCx, B = x) | CC4, B = 3 |

In Table 5, if the number of CCs is 4, the remaining states may go unused or may be used to indicate the start OFDM symbol position which is not represented for an arbitrary CC.

If the CIF has a size of 4 bits, the start OFDM symbol position of each CC may be represented as shown in Table 6.

TABLE 6

| CIF | Number of Available CCs | | | |
|---|---|---|---|---|
| | 2 | 3 | 4 | 5 |
| 0000 | CC0 | CC0 | CC0 | CC0 |
| 0001 | CC1, B = 1 | CC1, B = 1 | CC1, B = 1 | CC1, B = 1 |
| 0010 | CC1, B = 2 | CC1, B = 2 | CC1, B = 2 | CC1, B = 2 |
| 0011 | CC1, B = 3 | CC1, B = 3 | CC1, B = 3 | CC1, B = 3 |
| 0100 | N/A | CC2, B = 1 | CC2, B = 1 | CC2, B = 1 |
| 0101 | N/A | CC2, B = 2 | CC2, B = 2 | CC2, B = 2 |
| 0110 | N/A | CC2, B = 3 | CC2, B = 3 | CC2, B = 3 |
| 0111 | N/A | N/A | CC3, B = 1 | CC3, B = 1 |
| 1000 | N/A | N/A | CC3, B = 2 | CC3, B = 2 |
| 1001 | N/A | N/A | CC3, B = 3 | CC3, B = 3 |
| 1010 | N/A | N/A | N/A | CC4, B = 1 |
| 1011 | N/A | N/A | N/A | CC4, B = 2 |
| 1100 | N/A | N/A | N/A | CC4, B = 3 |
| 1101 | N/A | N/A | N/A | N/A |
| 1110 | N/A | N/A | N/A | N/A |
| 1111 | N/A | N/A | N/A | N/A |

Meanwhile, if indexes of uplink CCs are determined through linkage with downlink CCs, the uplink CCs and the downlink CCs do not need to be separately indexed. However, if the indexes of the uplink CCs are set regardless of downlink CCs, the indexes of the uplink CCs may be included. That is, after the start OFDM symbol of the cross-carrier scheduled and transmitted PDSCH is represented in a 3-bit CIF, the indexes of the uplink CCs may be represented using the remaining states. Table 8 shows an example in which the number of uplink CCs is 3.

TABLE 7

| CIF | Number of Available CCs | | | |
|---|---|---|---|---|
| | 2 | 3 | 4 | 5 |
| 000 | CC0 | CC0 | CC0 | CC0 |
| 001 | CC1, B = 1 | CC1, B = 2 | CC1, B = 3 | CC1, B = 3 |
| 010 | CC1, B = 2 | CC1, B = 3 | CC2, B = 3 | CC2, B = 3 |
| 011 | CC1, B = 3 | CC2, B = 2 | CC3, B = 3 | CC3, B = 3 |
| 100 | UL CC0 | CC2, B = 3 | UL CC0 | CC4, B = 3 |
| 101 | UL CC1 | UL CC0 | UL CC1 | UL CC0 |
| 110 | UL CC2 | UL CC1 | UL CC2 | UL CC1 |
| 111 | other purposes | UL CC2 | other purposes | UL CC2 |

As another method, a start OFDM symbol position index (or a DSI, a DEI, a DAdI and an offset value) of a cross-carrier scheduled and transmitted PDSCH may be indicated through higher layer signaling in a UE-specific or cell-specific manner. The term "cell" does not mean a cell of spatial meaning, but means one or more CCs managed by an arbitrary eNB.

If the start OFDM symbol position index of the PDSCH is signaled with respect to one or more CCs managed by an arbitrary eNB, that is, in a UE-specific manner, the start OFDM symbol position index (or the DSI, the DEI, the DAdI and the offset value) of the PDSCH may be included in RRC signaling with respect to all target CCs which may be cross-carrier scheduled to a UE. At this time, a signaling entity of each CC preferably includes a logical or physical index of a UE-specific CC and a start OFDM symbol position index (or a DSI, a DEI, a DAdI and an offset value).

In addition, if the start OFDM symbol position index of the PDSCH is signaled with respect to one or more CCs managed by an arbitrary eNB, that is, in a cell-specific manner, the start OFDM symbol position index (or a DSI, a DEI, a DAdI and an offset value) is may be indicated to all UEs within a cell through UE-specific RRC signaling or cell-specific RRC signaling of spatial meaning, with respect to all CCs which may be subjected to cross-carrier scheduling. Similarly, the signaling entity of each CC is preferably configured using a logical or physical index of a UE-specific CC and a start OFDM symbol position index (or a DSI, a DEI, a DAdI and an offset value) with respect to one or more CCs managed by an arbitrary eNB.

If a start OFDM symbol position index (or a DSI, a DEI, a DAdI and an offset value) is indicated through UE-specific RRC signaling, a configuration (that is, RRC grant) for RRC transmission may be made using a UE-specific primary downlink CC and an RRC message may be transmitted to a specific UE via the same UE-specific primary downlink CC. Alternatively, a configuration (that is, RRC grant) for RRC transmission may be made through one or a plurality of CCs in which a PDCCH is transmitted and an RRC message may be transmitted via a CC in which RRC grant is transmitted, in order to equalize the CC in which RRC grant is transmitted and the CC in which an actual RRC message is transmitted.

Even cell-specific RRC signaling of spatial meaning may be transmitted via CCs in which all UEs may receive the RRC grant and the RRC message. In addition, even in case of cell-specific RRC signaling, the CC in which the RRC grant is transmitted and the CC in which an actual RRC message is transmitted are preferably the same.

As described above, in the case in which a DCI format for cross carrier scheduling is configured using a CIF having a specific bit size, states represented by the CIF may not be enough to represent a start OFDM symbol position index (or a DSI, a DEI, a DAdI and an offset value). In this case, a specific field which is not used upon cross carrier scheduling may be combined with the states represented by the CIF so as to represent a start OFDM symbol position index (or a DSI, a DEI, a DAdI and an offset value).

For example, 1 bit of transmission power control (TPC) information having a size of 2 bits included in DCI format 1A/1B/1D/1A/2A/2 for downlink grant may be used to represent a start OFDM symbol position index (or a DSI, a DEI, a DAdI and an offset value) of a cross-carrier scheduled PDSCH. The remaining 1 bit may still be used as TPC information. This may be defined in Table 7.

TABLE 8

| 1-bit TPC Command Field in DCI format 1A/1B/1D/1/2A/2/3 | δ [dB] |
|---|---|
| 0 | −1 |
| 1 | +1 |

TPC information included in downlink grant may be received from a plurality of PDCCHs for cross carrier scheduling in a corresponding subframe and δ [dB] obtained by accumulating this information may be used to transmit the PUCCH of the subframe.

As another method, information about a start OFDM symbol of a cross-carrier scheduled PDSCH may be partially included in a sequence, with which a PDCCH is CRC-masked, to be transmitted and this information may be represented in combination with states included in a CIF. That is, if only CRC masking is used, since a UE ID is used for information about a start OFDM symbol, lack of UE ID may be caused. Accordingly, only two sequences such as a scrambling sequence all including "1" and a scrambling sequence all including "0" may be used as additional sequences for information about a start OFDM symbol and the remaining information may be represented by a CIF.

Figure 15:
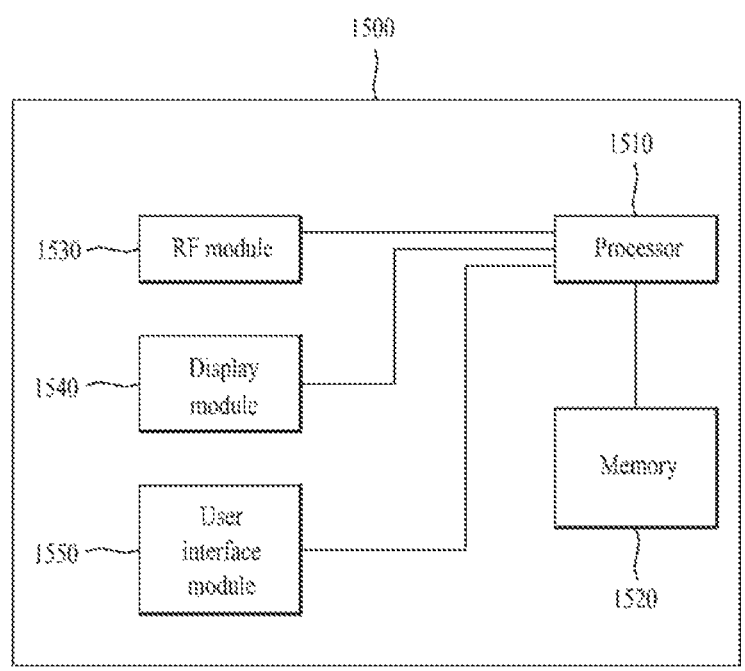
FIG. 15 is a block diagram showing a transmitter or receiver according to an embodiment of the present invention.

FIG. 15 is a block diagram showing a transmitter or receiver according to an embodiment of the present invention. The transmitter or receiver may be a part of an eNB or a UE.

Referring to FIG. 15, a transmitter/receiver 1500 includes a processor 1510, a memory 1520, a Radio Frequency (RF) module 1530, a display module 1540 and a user interface module 1550.

The transmitter/receiver 1500 is shown for convenience of description and some modules thereof may be omitted. In addition, the transmitter/receiver 1500 may further include necessary modules. In addition, some modules of the transmitter/receiver 1500 may be subdivided. The processor 1510 is configured to perform an operation of the embodiment of the present invention described with respect to the drawings.

More specifically, if the transmitter/receiver 1500 is a part of an eNB, the processor 1510 may perform a function for generating a control signal and mapping the control signal to a control channel set within a plurality of frequency blocks. If the transmitter/receiver 1500 is a part of a UE, the processor 1510 may confirm a control channel indicated thereto from a signal received through a plurality of frequency blocks and extract a control signal therefrom.

Thereafter, the processor 1510 may perform a necessary operation based on the control signal. For a detailed description of the operation of the processor 1510, reference may be made to the description associated with FIGS. 1 to 14.

The memory 1520 is connected to the processor 1510 so as to store an operating system, an application, program code, data and the like. The RF module 1530 is connected to the processor 1510 so as to perform a function for converting a baseband signal into a radio signal or converting a radio signal into a baseband signal. The RF module 1530 performs analog conversion, amplification, filtering and frequency up-conversion or inverse processes thereof. The display module 1540 is connected to the processor 1510 so as to display a variety of information. As the display module 1540, although not limited thereto, a well-known device such as a Liquid Crystal Display (LCD), a Light Emitting Diode (LED), or an Organic Light Emitting Diode (OLED) may be used. The user interface module 1550 is connected to the processor 1510 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "terminal" may also be replaced with the term user equipment (UE), subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication system and, more particularly, to a method and apparatus for receiving a downlink signal at a user equipment (UE) in a wireless communication system to which carrier aggregation is applied.

The invention claimed is:

1. A method for receiving a downlink signal at a mobile terminal configured with a plurality of component carriers in a wireless communication system, the method comprising:
receiving, by the mobile terminal, a physical downlink control channel (PDCCH); and
receiving, by the mobile terminal, a physical downlink shared channel (PDSCH) corresponding to the PDCCH,
wherein, if the PDSCH is cross carrier-scheduled by the PDCCH, a starting orthogonal frequency division multiplexing (OFDM) symbol of the PDSCH is given by an index of an OFDM symbol of a first slot in a subframe having two slots, the index being indicated by a higher layer parameter for a component carrier on which the PDSCH is received, and if the PDSCH is non cross carrier-scheduled by the PDCCH, the starting OFDM symbol of the PDSCH is indicated by a Control Format Indicator (CFI).

2. The method according to claim 1, wherein the cross carrier-scheduled PDSCH is received on a component carrier different from a component carrier on which the PDCCH is received.

3. The method according to claim 1, wherein the cross carrier-scheduled PDSCH is indicated by the carrier indicator field included in the PDCCH.

4. The method according to claim 1, wherein the non cross carrier-scheduled PDSCH is received on a component carrier on which the PDCCH is received.

5. A mobile terminal configured with a plurality of component carriers in a wireless communication system, the mobile terminal comprising:

a receiver; and a processor operatively connected to the receiver and configured to receive, a physical downlink control channel (PDCCH) and receive a physical downlink shared channel (PDSCH) corresponding to the PDCCH, wherein, if the PDSCH is cross carrier-scheduled by the PDCCH, a starting orthogonal frequency division multiplexing (OFDM) symbol of the PDSCH is given by an index of an OFDM symbol of a first slot in a subframe having two slots, the index being indicated by a higher layer parameter for a component carrier on which the PDSCH is received, and if the PDSCH is non cross carrier-scheduled by the PDCCH, the starting OFDM symbol of the PDSCH is indicated by a Control Format Indicator (CFI).

6. The mobile terminal according to claim 5, wherein the cross carrier-scheduled PDSCH is received on a component carrier different from a component carrier on which the PDCCH is received.

7. The mobile terminal according to claim 5, wherein the cross carrier-scheduled PDSCH is indicated by the carrier indicator field included in the PDCCH.

8. The mobile terminal according to claim 5, wherein the non cross carrier-scheduled PDSCH is received on a component carrier on which the PDCCH is received.

* * * * *